US006832859B1

(12) United States Patent
Bell et al.

(10) Patent No.: US 6,832,859 B1
(45) Date of Patent: Dec. 21, 2004

(54) FREE SPACE OPTICAL SYSTEM WITH MULTIPLE FUNCTION DETECTORS

(75) Inventors: John A. Bell, Issaquah, WA (US); Nicholas E. Bratt, Edmonds, WA (US); Herman M. Presby, Highland Park, NJ (US); Stuart Ferrier, Seattle, WA (US); Mark Lewis Plett, Redmond, WA (US)

(73) Assignee: Terabeam Corporation, Falls Church, VA (US)

( * ) Notice: Subject to any disclaimer, the term of this patent is extended or adjusted under 35 U.S.C. 154(b) by 333 days.

(21) Appl. No.: 10/072,292

(22) Filed: Feb. 7, 2002

Related U.S. Application Data

(63) Continuation-in-part of application No. 09/847,608, filed on May 1, 2001.

(51) Int. Cl.$^{7}$ .............................. G02B 6/36; G02B 6/38

(52) U.S. Cl. ............................. 385/78; 385/77; 385/76; 385/72; 385/31

(58) Field of Search .............................. 385/31, 37, 39, 385/42, 52, 70, 72, 76–78, 90

(56) References Cited

U.S. PATENT DOCUMENTS 4,911,522 A * 3/1990 Iwamoto et al. .............. 385/97
5,668,899 A 9/1997 Jadrich
5,682,255 A 10/1997 Friesem et al.
5,720,653 A 2/1998 Miller et al.
6,038,043 A 3/2000 Bahuguna et al.
6,212,010 B1 4/2001 Iizuka et al.
6,347,178 B1 * 2/2002 Edwards et al. ............ 385/147
6,690,459 B2 * 2/2004 Bruns ......................... 356/153

OTHER PUBLICATIONS

Samuel C. Barde; James A. Arns; Willis S. Colburn; and Joel B. Williams, Volume–Phase Holographic Gratings and the Efficiency of Three Simple VPH Gratings, Jun. 2000, pp. 809–820, vol. 112, Publications of the Astronomical Society of the Paciifc.

James A. Arns; Willis S. Colburn; and Samuel C. Barden, Volume Phase Gratings for Spectroscopy, Ultrafast Laser Compressors, and Wavelength Division Multiplexing, Proc. SPIE vol. 3779, pp. 313–323, Oct. 1999.

Glossary of frequently used terms in Photorefractive Optics, Sep. 21, 1998 version downloaded Dec. 20, 2001, pp. 1–5, http:/ /odi.iap.physik.tu–darmstadt.de/gloss.html.

* cited by examiner

*Primary Examiner*—Rodney Bovernick
*Assistant Examiner*—Kevin S. Wood
(74) *Attorney, Agent, or Firm*—Blakely Sokoloff Taylor & Zafman LLP

(57) ABSTRACT

An optical fiber assembly includes an optical fiber and ferrule. The ferrule's face is partitioned into several regions. Optical elements can be formed on the regions to diffract light incident on the ferrule. Alternatively, the ferrule's face may have several reflective facets. Light incident on the end of the optical fiber propagates to a communications detector. Light incident on the ferrule's face is redirected to tracking detectors, each arranged to receive the redirected light from a preselected region of the ferrule. The output signals of the tracking detectors are used to adjust the alignment between the incident light and the assembly. Alternatively, tracking fibers or a quadrant cell may be used to directly receive light that would otherwise be incident on the ferrule's face.

30 Claims, 9 Drawing Sheets

SIDE CROSS-SECTION

END VIEW

TOP VIEW

TOP VIEW

SIDE VIEW

TOP VIEW

SIDE VIEW

FREE SPACE OPTICAL SYSTEM WITH MULTIPLE FUNCTION DETECTORS

CROSS REFERENCE TO RELATED APPLICATIONS

The present application is a Continuation-In-Part of U.S. patent application Ser. No. 09/847,608, filed May 1, 2001, titled "Optical Tracking System With Reflective Fiber," with inventors James S. Webb, John A. Bell, and Herman M. Presby, and which is incorporated herein by reference in its entirety.

BACKGROUND OF THE INVENTION

1. Field of the Invention

The present invention is related to free space optical systems and, in particular, to a multiple function detector in a free space optical system.

2. Background Information

With the increasing popularity of wide area networks, such as the Internet and/or World Wide Web, network growth and traffic have exploded in recent years. Network users continue to demand faster networks, and as network demands continue to increase, existing network infrastructures and technologies are reaching their limits.

An alternative to existing hardwire or fiber network solutions is the use of wireless optical telecommunications technology. Wireless optical telecommunications utilize beams of light, such as lasers, as the carriers of communications signals, and therefore do not require the routing of cables or fibers between locations. Data or information is encoded into a beam of light, and then transmitted through free space from a transmitter to a receiver. The receiver includes a communications detector (including a demodulator or decoder) to extract the data or information from the optical signals.

For point-to-point free space laser communications, the use of narrow optical beams provides several advantages, including data security, high customer density, and high directivity. High directivity makes the achievement of high data rates and high link availability easier, due to higher signal levels at a receiver. In order to take full advantage of this directivity, some form of tracking is often necessary to keep the antennas of a transmitter and of the receiver properly pointed at each other. For example, a transmitted optical beam with a one milli-radian divergence has a spot diameter at the receiver of about one meter at a one-kilometer range. Thus, movement of the transmitter or receiver by even a small fraction of the divergence (or field-of-view) could compromise the link unless active tracking is employed.

The transmitters and receivers are typically located in optical terminals, which may be located in windows of buildings, on rooftops, or other architectural structures. "Tracking" is considered from the receiving terminal's perspective and refers to the ability of the receiving terminal to see the beam and to focus the beam onto the receiving terminal's detector. The receiving terminal tracks the received beam's direction in two angular degrees of freedom.

During communications, both terminals are transmitting to each other and receiving from each other. In this scenario, proper beam tracking can be difficult, especially considering the fact that the target at the receiving terminal may be quite small relative to the large separation distance between the transmitting and receiving terminals. Additionally, because buildings (or other architectural structures where terminals may be located) vibrate and sway with wind and temperature changes the receiving terminal is usually moving with respect to the transmitting terminal.

There are several known ways to control tracking. For example, in one known system, a free space optical system receiver receives an incoming light beam from a transmitting terminal. A lens or other collection optics collects light from the light beam and focuses it onto a beam splitter, which directs a major portion of the light beam to a communication detector. The communication detector recovers the wideband digital information carried on the light beam. In addition, the beam splitter directs a small portion of the light beam to a tracking detector. The tracking detector detects when the free space optical receiver and the transmitting terminal are misaligned. This tracking information is used to adjust the alignment between the receiver and the transmitting terminal.

In an effort to design and build free space optical systems, smaller, fewer and/or cheaper components may prove beneficial. Although devices to implement the communication detector are commonly low cost devices, such as a PIN photodiode, or an avalanche photodiode (APD), devices to implement the beam splitter and the tracking detector are commonly quite expensive. As such, any free space optical system that could eliminate such expensive components would be advantageous. Additionally, any free space optical system that has fewer components may be cheaper to build and operate because both the major portion of the light beam and the small portion of the light beam have to be aligned to the communication detector and the tracking detector, respectively.

SUMMARY OF THE INVENTION

In accordance with aspects of the present invention, an optical tracking system for use in an optical receiver of an optical communication system is provided. In one aspect, the optical tracking system includes an optical fiber assembly. In addition to an optical fiber, the optical fiber assembly includes a ferrule with a face having several facets and/or optical element coatings. These facets and optical element coatings reflect and/or diffract a portion of a received free space optical signal, the distribution of the reflected or diffracted light depending on the alignment between the optical receiver and the received free space optical signal. The optical tracking system also includes one or more tracking detectors to detect the reflected or diffracted light and generate signals as a function of the distribution of the reflected or diffracted light. These signals can be used to adjust the alignment between the optical receiver and the received free space optical signal. The optical fiber is used to propagate the remaining portion of the received free space optical signal to a communications detector.

In a further refinement, the optical assembly may include collection optics to help direct the reflected or diffracted light to the tracking detectors.

In another aspect, the optical fiber assembly includes a quadrant cell and an optical fiber. The optical fiber is inserted in an opening in the center of the quadrant cell. The optical fiber is used to propagate light from the received free space optical signal that is incident on the fiber to a communications detector. The quadrant cell is used to detect light (if any) of the received free space optical signal that misses the optical fiber. The quadrant detector generates signals as a function of the distribution of the light that misses the optical fiber. These signals can be used to adjust the alignment between the optical receiver and the received free space optical signal.

In still another aspect, the optical fiber assembly includes a mounting plate and an optical fiber mounted in the center thereof. The mounting plate is grooved and several tracking fibers are positioned in the grooves. The optical fiber is used to propagate light from the received free space optical signal that is incident on the fiber to a communications detector. The tracking fibers used to detect light (if any) of the received free space optical signal that misses the optical fiber. The tracking fibers propagate signals as a function of the distribution of the light that misses the optical fiber. These signals can be used to adjust the alignment between the optical receiver and the received free space optical signal.

In yet another aspect, the optical fiber assembly includes a central optical fiber encircled with several tracking fibers. As in the mounting plate aspect, the optical fiber propagates light from a received free space optical signal to a communications detector, whereas the tracking fibers propagate signals as a function of the distribution of the light that misses the optical fiber. These signals can be used to adjust the alignment of the optical receiver and the free space optical signal.

BRIEF DESCRIPTION OF THE DRAWINGS

Non-limiting and non-exhaustive embodiments of the present invention can be understood by reference to the figures wherein references with like reference numbers generally indicate identical, functionally similar, and/or structurally similar elements. The drawing in which an element first appears is indicated by the leftmost digit(s) in the reference number.

DETAILED DESCRIPTION OF THE ILLUSTRATED EMBODIMENTS

Figure 1:
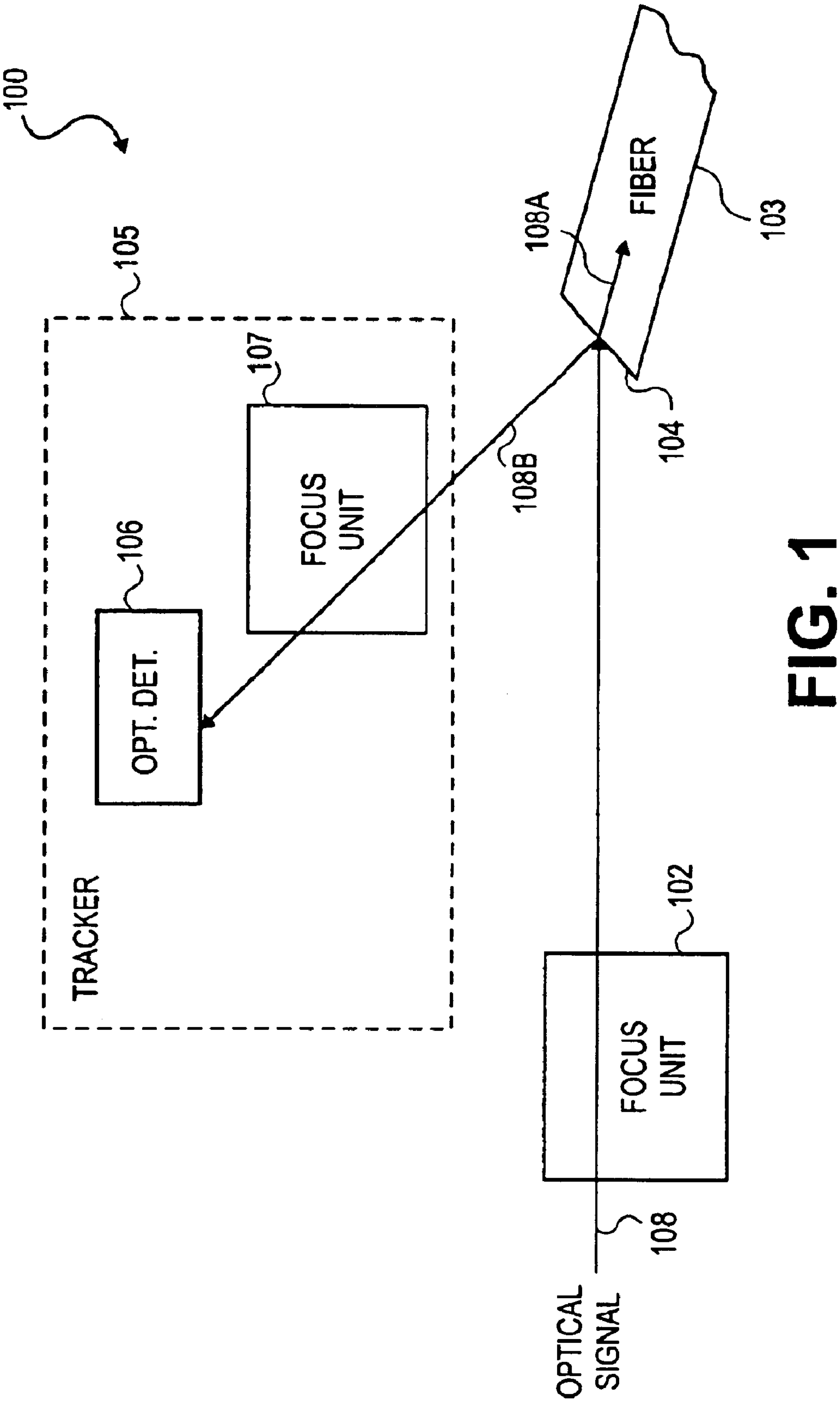
FIG. 1 is a block diagram illustrating a tracking system for use in an optical communication system, according to one embodiment of the present invention.

A multiple function detector is described herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as detector, light beam, optics, and so forth. These terms are commonly employed by those skilled in the art to convey the substance of their work to others skilled in the art.

Other parts of the description will be presented in terms of operations performed by a computer system, using terms such as receiving, detecting, collecting, transmitting, reflecting, refracting, and so forth. As is well understood by those skilled in the art, these quantities and operations take the form of electrical, magnetic, or optical signals capable of being stored, transferred, combined, and otherwise manipulated through mechanical and electrical components of a computer system; and the term "computer system" includes general purpose as well as special purpose data processing machines, systems, and the like, that are standalone, adjunct or embedded.

Various operations will be described as multiple discrete blocks performed in turn in a manner that is most helpful in understanding the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment, an optical tracking system according to the present invention is part of an optical communication system having an optical transmitter and an optical receiver. In a typical operation of the optical communication system, the optical transmitter provides an optical signal having communication information. The optical receiver receives the optical signal. The optical receiver includes a communications detector to extract the communication information from the received optical signal. The optical tracking system maintains alignment between the optical receiver and the optical signal to help optimize performance of the optical communication system. Embodiments of an optical tracking system according to the present invention are described below.

FIG. 1 illustrates an optical tracking system 100 (not to scale) for use in an optical communication system, according to one embodiment of the present invention. In this embodiment, optical tracking system 100 is part of an optical receiver (not shown). In one embodiment, optical tracking system 100 includes a focus unit 102, a fiber 103 with an angled tip 104, and a tracker 105. In one embodiment, tracker 105 includes an optical detector 106 and a focus unit 107. An optical transmitter (not shown) provides an optical signal, represented by an arrow 108 (and referred to hereinafter as optical signal 108), to the optical receiver containing optical tracking system 100.

Focus unit 102 can include optics to focus optical signal 108 on a desired target. In one embodiment, optical signal 108 can be implemented using a beam of laser light. The laser light can have a wavelength ranging between 500 nm and 2000 nm, as is commonly used in optical communication systems. Other embodiments may use radiation of different wavelengths that are suitable for the intended application.

In one embodiment, the optics of focus unit 102 is implemented using a lens or lenses. In other embodiments, focus unit 102 can be implemented, for example, using reflective optical imaging with spherical, ellipsoidal, or other reflective surfaces. In yet another embodiment, focus unit 102 can include transmissive or reflective holographic optical elements such as, for example, the holographic optical element disclosed in co-pending and commonly assigned U.S. patent application Ser. No. 09/627,8106 entitled "Apparatus and Method for Correcting Aberrations in Photon Collection Devices," filed Jul. 28, 2000.

Fiber 103 can be a standard optical fiber with a cladding surrounding either a multi-mode or a single-mode core. Fiber 103 and focus unit 102 are arranged so that the axis of the received optical signal 108 is parallel to the axis of the beam that optimally couples to fiber 103. This coupling is determined in part by the refraction of light at the air-fiber interface at angled tip 104. Assuming the fiber includes a glass fiber core, a typical index of refraction of the glass fiber core is roughly 1.5 compared to the index of refraction of air, which is close to one. By application of Snell's law of refraction, an angle-polished fiber that is tilted about eight degrees, for example, from perpendicular to the fiber's longitudinal axis, the deviation of the optimal coupling beam from the fiber axis is roughly four degrees. Consequently, the angle of incidence of the optimally coupling beam to the angle-polished fiber tip is roughly 12 degrees, and the angle of deviation between the optimally coupling beam and the reflected beam is roughly 24 degrees.

In other embodiments, other polish angles and/or cores with difference indices of refraction can be used, which would result in different deviations of the optimal coupling beam.

Angled tip 104 of fiber 103 has an angle that reflects a portion of optical signal 108 toward tracker 105 when optical signal 108 is misaligned within a selected tolerance. One embodiment of angled-tip 104 is described in more detail below in conjunction with FIG. 2.

Tracker 105, in this embodiment, is a unit that detects and corrects for misalignment between optical signal 108 and the optical receiver using any suitable tracking technique. For example, tracker 105 can implement the tracking technique disclosed in co-pending and commonly assigned U.S. patent application Ser. No. 09/627,277, entitled "Method and Apparatus For Tracking in an Optical Communication System," or U.S. patent application Ser. No. 09/627,819, entitled "Method And Apparatus For Tone Tracking In Wireless Optical Communication Systems," both filed Jul. 28, 2000. In this embodiment, tracker 105 uses optical detector 106 and focus unit 107.

Optical detector 106, in this embodiment, detects misalignment between optical signal 108 and the optical receiver, using the known relative positions and orientations of the other elements of optical tracking system 100.

Focus unit 107 can include optics, such as lenses, to focus a reflection from fiber 103 onto optical detector 106. Similar to focus unit 102 (described above) in other embodiments, focus unit 107 can be implemented using optics other than lenses. For example, in an alternative embodiment, focus unit 107 can include reflective optical imaging with spherical, ellipsoidal or other reflective surfaces. In yet another embodiment, focus unit 107 can include transmissive or reflective holographic optical elements.

This embodiment of optical tracking system 100 can operate as follows. Focus unit 102 receives optical signal 108. Focus unit 102 contains optics that focus optical signal 108 onto angled tip 104 of fiber 103. In particular, focus unit 102 is arranged to focus optical signal 108 onto the core of fiber 103 (e.g., see FIG. 2) with a pre-selected spot size. When optical signal 108 and the optical receiver are properly aligned, focus unit 102, ideally, centers the beam spot on the longitudinal axis of fiber 103. Fiber 103 then propagates a relatively large portion of optical signal 108, represented by an arrow 108A (referred to hereinafter as non-reflected optical signal 108A) shown in fiber 103. Fiber 103 propagates non-reflected optical signal 108A to a communications detector (not shown) that extracts communication information from the optical signal.

However, a relatively small portion of optical signal 108 is reflected from angled tip 104, as represented by an arrow 108B in FIG. 1 (also referred to herein as reflected optical signal 108B). For example, in one embodiment, about four percent to five percent of the power of optical signal 108 is reflected by fiber 103 to form reflected optical signal 108B. The power of reflected optical signal 108B can be adjusted by coating angled tip 104 (described below in conjunction with FIG. 2). Focus unit 107 then focuses reflected optical signal 108B onto optical detector 106, which then uses information provided by reflected optical signal 108B to detect any misalignment between optical signal 108 and the optical receiver containing optical tracking system 100. Tracker 105 uses information provided by optical detector 106 to adjust the alignment between optical signal 108 and the optical receiver using a suitable tracking technique.

In contrast, known systems typically include a beam splitter to receive the optical signal from a focus unit (such as focus unit 102). The beam splitter would allow most of the optical signal to pass through to the communications detector, with the beam splitter directing a portion (e.g., 10%) toward a tracking unit. Thus, the communications unit receives an optical signal that is already reduced by the amount that is split to the tracking unit. Moreover, because the communications detector commonly includes an optic fiber to receive the main portion of the optical signal from the beam splitter, reflection loss from the fiber can result in still more loss. Reflection loss will generally result from the difference in refractive index between the air and the glass of fiber 103. The loss from the beam splitter combined with the reflective loss from the air-fiber interface can degrade the performance of the communications detector.

Compared to the above-described known system, this embodiment of optical tracking system 100 has several advantages. For example, optical tracking system 100 omits the beam splitter and, instead, uses a portion of optical signal 108 that would likely be reflected by the air-fiber interface in any case. Thus, optical tracking system 100 can allow more of the power of optical signal 108 to be used by the communications detector (not shown) to extract the communication information, which can improve the performance of the optical receiver. In addition, beam splitters tend to be costly compared to forming an angled-tip on a fiber. Consequently, optical tracking system 100 can be less costly than systems that use a beam splitter. Still further, the beam splitter occupies space in the optical receiver, which can undesirably increase the total size of the optical receiver. Yet another advantage is that if the position of the fiber 103 is disturbed (e.g., experiences vibration), optical tracking system 100 can detect the disturbance and adjust alignment in response. That is, the changed position of fiber 103 changes the direction of reflected optical signal 108B that is received by optical detector 106, which then causes an appropriate adjustment in the alignment. In contrast, in a beam splitter system, changes in the position of the fiber (which is "downstream" from the beam splitter) does not result a change in the reflected optical signal 108B.

Figure 2B:
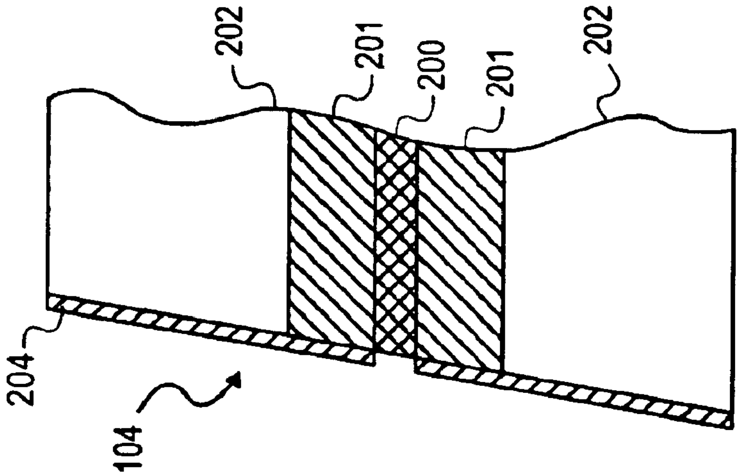
FIG. 2B is a cross-sectional diagram illustrating an angle-polished fiber for use in the tracking system of FIG. 1, according to yet another embodiment of the present invention.
Figure 2A:
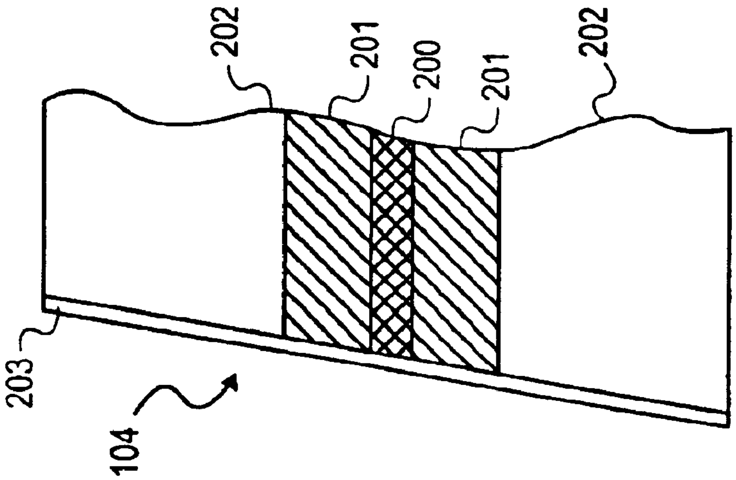
FIG. 2A is a cross-sectional diagram illustrating an angle-polished fiber for use in the tracking system of FIG. 1, according to another embodiment of the present invention.
Figure 2:
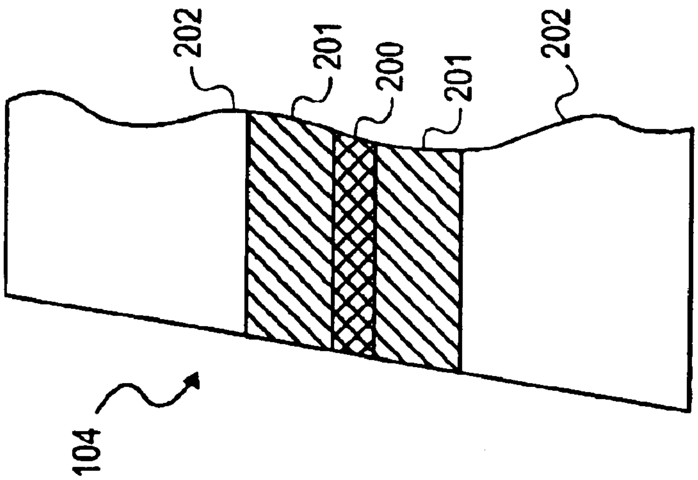
FIG. 2 is a cross-sectional diagram illustrating an angle-polished fiber for use in the tracking system of FIG. 1, according to one embodiment of the present invention.

FIG. 2 illustrates fiber 103 (FIG. 1) in cross section (not to scale), according to one embodiment of the present invention. In this embodiment, fiber 103 includes a core 200 surrounded by a cladding 201. Typically, a ferrule 202 surrounds cladding 201 as well. Cladding 201 is typically formed from silica with a lower refractive index than that of core 200. This configuration allows light to propagate through core 200 with essentially total internal reflection. Fiber 103 can be a single mode or multimode fiber.

In this embodiment, core 200 has a diameter of about 60 μm. Including core 200 and cladding 201, fiber 103 has a diameter of about 125 μm. Including ferrule 202, fiber 103 has a diameter of about 2.5 mm. In one embodiment, fiber 103 is implemented using a multimode fiber available from Wave Optics, Inc., Mountain View, Calif. Of course, other embodiments can use other commercially available optical fibers that are suitable for the intended application.

In one embodiment, the plane containing the surface of angled tip 104 and the longitudinal axis of fiber 103 forms an angle of about eight degrees (also referred to herein as the angle of angle tip 104). In this embodiment, standard angle-polish techniques are used to form angled tip 104 on one end of fiber 103. In other embodiments, the angle of angled tip 104 can range from greater than zero but less than ninety degrees, including angles ranging from four to forty-five degrees.

FIG. 2A illustrates another embodiment (not to scale) in which fiber 103 includes a coating 203 formed on the surface of angled tip 104. Coating 203 is a partially reflective coating used to increase reflection from cladding 201. Such optical coatings are commercially available. The increased reflection from cladding 201 tends to improve the performance of tracker 105 in correcting misalignments. Thus, this configuration can advantageously allow increased reflection by the cladding when there is misalignment, which can help improve the performance of tracker 105 in correcting the misalignment.

FIG. 2B illustrates an alternative coated fiber embodiment (not to scale) in which a coating 204 is formed from a metal, such as Aluminum. Coating 204 would cover the entire surface of angled tip 104 as well as the ferrule. The portion of the metal coating covering the core would then be removed as shown in FIG. 2B. This embodiment allows reflected optical signal 108B (FIG. 1) to have more power when there is misalignment between optical signal 108 (FIG. 1) and the optical receiver (not shown).

Figure 3:
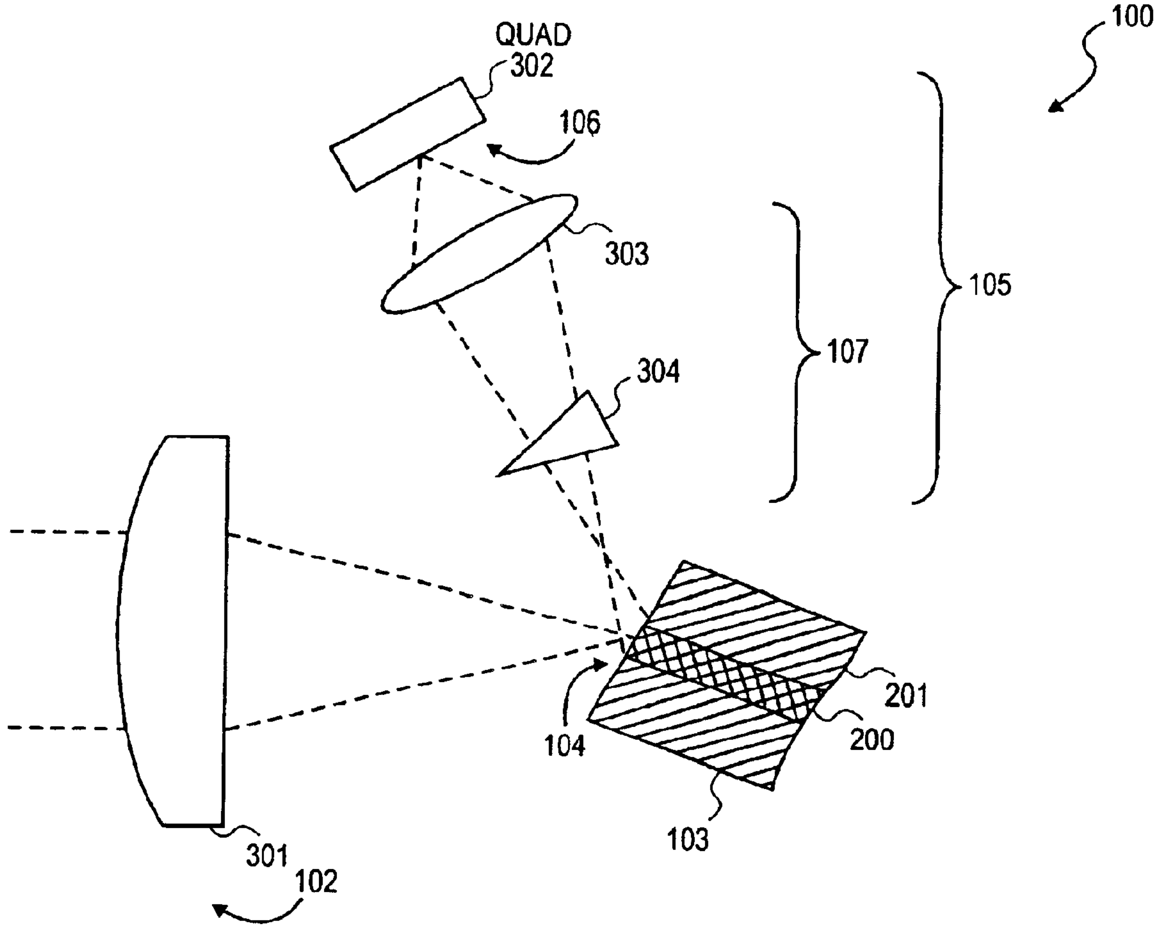
FIG. 3 is a diagram illustrating an implementation of the tracking system of FIG. 1, according to an embodiment of the present invention.

FIG. 3 illustrates an implementation (not to scale) of optical tracking system 100 (FIG. 1) for use in a laser communication system, according to one embodiment of the present invention. In this embodiment, focus unit 102 is implemented using a focusing lens 301. As previously described for focus unit 102 in conjunction with FIG. 1, focusing lens 301 focuses the laser beam implementing optical signal 108 (FIG. 1) onto angled tip 104 of fiber 103. Focusing lens 301 is designed for the anticipated diameter of optical signal 108 when received and for the intended focal length. In addition, in some embodiments, the position of focusing lens 301 can be adjusted to optimize the focusing process (also referred to as active focusing) and not disturb the imaging between angled tip 104 and optical detector 106.

In one embodiment, optical detector 106 is implemented using a multi-cell detector. In this particular embodiment, optical detector 106 is implemented using a quad cell detector 302 (i.e., an optical detector device four cells or regions). For example, in one embodiment, optical detector 106 is implemented using a J16 series Germanium quad cell, available from Judson Technologies, LLC, Montgomeryville, Pa. Of course, other embodiments may use different optical detectors that are suitable for the intended application. Quad cell detector 302 is positioned so that when optical signal 108 (FIG. 1) and the optical receiver (not shown) are properly aligned, reflected optical signal 108B (FIG. 1) equally illuminates all four cells of quad cell detector 302. Thus, when the cells of quad cell detector 302 are not equally illuminated, there is misalignment between optical signal 108 and the optical receiver. In this way, quad cell detector 302 detects misalignment between optical signal 108 and the optical receiver. Although a quadrant detector system is described for this embodiment of optical detector 106, different detector systems can be used in other embodiments. For example, optical detector 106 can be implemented using a lateral effect device such as, for example, a SC-10D device available from UDT Sensors, Inc., Hawthorne, Calif.

Further, in this embodiment, focus unit 107 is implemented with a lens 303 and an optical wedge 304. Optical wedge 304 operates to steer the optical signal (i.e., reflected optical signal 108B shown in FIG. 1) reflected from angled tip 104 of fiber 103 to lens 303. Wedge 304 is used in embodiments, for example, in which the position of angled tip 104 of fiber 103 can be moved in an axial direction. As previously described for focus unit 107 in conjunction with FIG. 1, lens 303 and optical wedge 304 operate together to focus reflected optical signal 108B (FIG. 1) onto quad detector 302. In other embodiments, optical wedge 304 may be omitted. These other embodiments are advantageously used in systems without active focusing.

Unitary Alignment-Free Tracking System

Other aspects of the present invention include a unitary alignment-free multiple function (tracking and communication) detector realized in a free space optical system using only standard components. The free space optical system may be a hybrid of free space optics in combination with office-based and/or roof-based interconnected hubs. The interconnected hubs may be a mixture of free space optical links and optical fiber links, although other types of interconnecting media may be used as well (e.g., radio frequency).

Figure 4B:
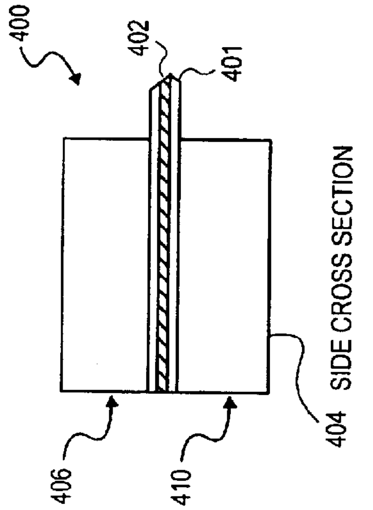
FIGS. 4A and 4B respectively are front and side cross sectional diagrams illustrating an optical fiber assembly, according to an embodiment of the present invention.
Figure 4A:
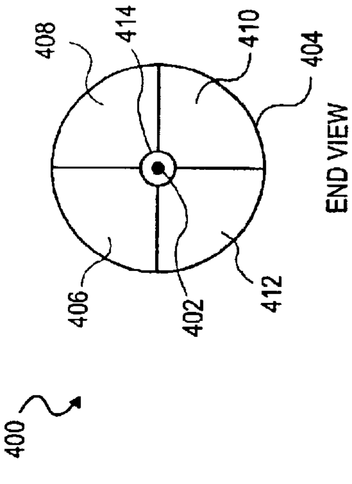

FIGS. 4A and 4B illustrate an end view and a side cross-sectional view, respectively, of a diffraction-based (e.g., from a surface grating or from a hologram) optical fiber assembly 400, according to an embodiment of the present invention. The example optical fiber assembly 400 is a multifunction optical element in that it functions to deliver optical signal 108 to a communication detector as well as to a set of tracking detectors.

In this embodiment, a light beam is focused onto an optical fiber surrounded by a ferrule. Light that is collected by the optical fiber is guided by the optical fiber to a communication detector. Light that is reflected/diffracted by the ferrule is used for tracking. Unlike prior art systems, an optical fiber assembly such as the optical fiber assembly 400 does not need precise alignment of the light that has been reflected/diffracted, as will be described below.

Referring to FIGS. 4A and 4B, the optical fiber assembly 400 includes an optical fiber 401, which may be a multimode optical fiber or a single mode optical fiber. The optical fiber 401 includes a core 402 and is surrounded by a ferrule 404. The optical fiber 401 is a well-known optical fiber, e.g., typically about one hundred twenty-five microns in diameter, with the core 402 typically about sixty-two microns in diameter. According to this embodiment of the present invention, the face of the ferrule 404 is divided into regions 406, 408, 410, and 412, each of which has a diffraction grating. Note, the cross-sectional view of FIG. 4B is taken diagonally across the face of the ferrule 404 (as shown in FIG. 4A). The face of polished ferrule 404, which includes the polished tip of the optical fiber 401, also has a region 414 aligned to include the core 402 of optical fiber 401 that allows the core 402 to receive light. In this embodiment, each of the regions 406, 408, 410, and 412 covers approximately one-quarter of the face of the ferrule 404 and the region 414 is located at the vertex of the regions 406, 408, 410, and 412. Although this embodiment has four regions with diffraction gratings, other embodiments may have a different number of regions.

The diffraction gratings of regions 406, 408, 410 and 412 can be implemented in several ways. By way of background, when a light beam strikes a flat mirror normal to the mirror surface, the light beam has an incident angle $\theta_i$ and the mirror reflects light at reflected angle $\theta_r$, equal and opposite to that of the incident angle $\theta_i$. However, when a light beam strikes a surface grating that has undulations with a regular spacing between them equal to (a period of) d, and the light beam incident on the grating has a spatial extent large enough to sample many of the undulations, some of the light is redirected into one or more diffracted beams. Generally, there will still be some reflected light (0$^{th}$ order reflected beam) that will have a reflected angle $\theta_r$, equal and opposite to that of the incident angle $\theta_r$. Other diffracted light ($1^{st}$ order diffracted beam, $2^{nd}$ order diffracted beam, −1 order diffracted beam −2 order diffracted beam, and so forth) will have a diffracted angle $\theta_d$ greater than or less than that of the incident angle $\theta_i$ as is well known. Typically, a grating is designed to efficiently diffract most light into only one order beam (e.g., a blazed grating). For example, a grating may be designed to diffract light into the $1^{st}$ order diffracted beam. The diffracted angle $\theta_d$ of each order beam is dependent on, among other things, the wavelength of the incident light beam, the incident angle $\theta_i$ and the period d of the undulations. The azimuthal orientation of the grating undulations (with respect to the surface normal), together with the direction of the incident light, determines the azimuthal direction of the diffracted light.

In one embodiment, a coating may be applied to regions 406, 408, 410 and 412. The material for the coating may be the same across the face of the optical fiber assembly 400. Each of regions 406, 408, 410, and 412, however, may have its own particular grating.

In one embodiment, the coating may include a volume phase grating in a photopolymer or dichromate gelatin. The diffraction efficiency of a phase grating is strongly dependent on the angle of incidence, however, depending on the thickness of the grating film. For low F-number light beams incident on the tip of ferrule 404, the angle of incidence sensitivity may lead to a reduced coupling efficiency to any downstream detectors.

Alternatively, the coating may include a surface grating with a reflective metal film (e.g., aluminum). The metal may be removed from the region 414 using photolithographic methods. The surface grating may be produced by replication from a master grating or produced in photoresist using a computer generated grating mask pattern.

In another embodiment, the coating may include a holographic optical element. For example, a volume phase hologram may provide for diffraction throughout the volume of the thickness of the coating.

According to another embodiment, material for holding or fixing a grating may be deposited on the tip of the ferrule 404. For example, a surface grating can be formed using the material. In one embodiment, the coating may be embossed on the tip of ferrule 404 using a known embossing technique to form the surface grating.

In still another embodiment, the tip of ferrule 404 is not coated, but a thin window mounted in front of a non-fiber-coupled communication detector could be coated with a diffractive or holographic film in a manner similar to the embodiments described above. The window and detector assembly could be packaged in a rigid assembly to achieve the benefits of a unitary structure.

The optical fiber assembly 400 may be used in a variety of free space optical systems. One example is described below in conjunction with FIG. 5.

Figure 5:
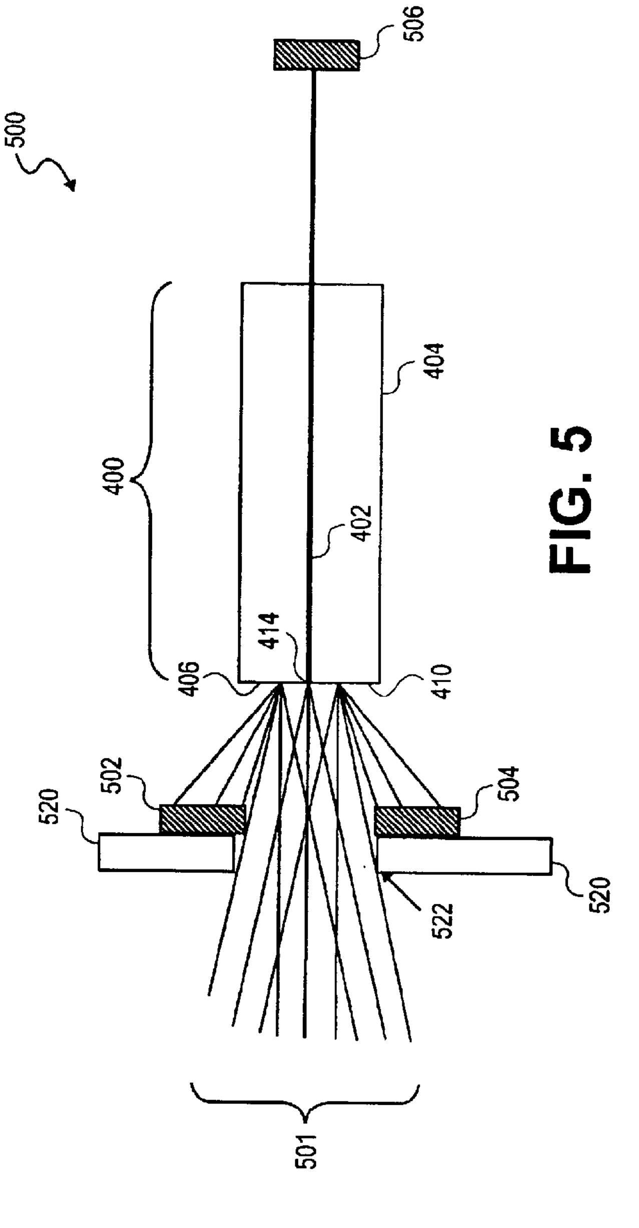
FIG. 5 is a diagram illustrating an example free space optical system that includes the optical fiber assembly of FIGS. 4A and 4B, according to an embodiment of the present invention.

FIG. 5 illustrates a side cross-sectional view of a free space optical system 500 that includes the optical fiber assembly 400 (FIGS. 4A and 4B) for use in receiving an incoming light beam 501. In addition, system 500 includes detectors 502 and 504, communication detector 506 and a mount 520 having an opening 522. This embodiment of system 500 also includes two other detectors (not shown) that are similar to detectors 502 and 504.

In this embodiment, detectors 502 and 504 are attached to mount 520. The two other detectors (not shown) are also attached to mount 520. Mount 520 is positioned so that opening 522 is aligned with region 414 of ferrule 404. In addition, the positions of mount 520 and detectors 502 and 504 attached thereto are selected so that detectors 502 and 504 receive light diffracted from regions 406 and 410. In a similar manner, the two other detectors (not shown) are positioned on mount 520 to receive light diffracted from regions 408 and 412 (FIG. 4A).

In one embodiment, the tracking detectors (e.g., detectors 502 and 504) are placed in close proximity to the tip of ferrule 404 so that the size of the light beam 501 can remain relatively small. That is, the diffracted beams do not overfill small tracking detectors. In this embodiment, the mount 520 is placed near the tip of ferrule 404 so that the incoming light beam 501 will pass through the opening 522. The mount 520 may be a printed circuit board or an aluminum substrate, similar to a hybrid integrated circuit package.

In this embodiment, four tracking-detectors are used to be comparable to free space optical systems that use quadrant detectors. However, other embodiments may have three or more detectors to provide sufficient tracking information for light beam tracking.

In this embodiment, the free space optical system 500, light is redirected to the detectors 502 and 504 without intervening collection optics.

In operation, the free space optical system 500 receives the incoming light beam 501. The regions 406 and 410 redirect (e.g., via diffraction) portions of the incoming light beam 501 to the detectors 502 and 504, respectively. For example, if the free space optical system 500 and the incoming light beam 501 are misaligned, then the regions 406 and 410 of the ferrule 404 may receive different fractions of the incoming light beam 501. Similarly, the regions 408 and 412 (FIG. 4A) can redirect portions of the incoming light beam 501 to their associated detectors (not shown). These detectors may be off-the-shelf low cost optical detectors such as PIN photodiodes, or avalanche photodiodes (APDs). Collectively, these detectors and diffractive regions on the ferrule tip function as a quadrant detector.

These detectors each output a signal that is dependent on the amount of light of the incoming light beam 501 that is incident on its corresponding region on the tip of ferrule 404. For example, each detector output signal may have a voltage level that is a function of the amount of light incident on its corresponding region. To determine whether the incoming light beam 501 and the optical fiber assembly 400 are properly aligned horizontally, the sum of the detector output signals corresponding to the regions 408 and 410 can be subtracted from the sum of the detector output signals corresponding the regions 406 and 412 (FIG. 4A). The resulting difference is divided by the sum of the detector output signals from all four regions 406, 408, 410, and 412. When properly aligned horizontally, the resulting difference will be zero. A feedback system may be used to adjust (and maintain) the alignment of the incoming light beam 501 so that the difference is zero.

The vertical alignment can be adjusted in a similar manner. More particularly, to determine whether the light beam 501 and the optical fiber assembly 400 are properly aligned vertically, the sum of the detector output signals corresponding to the regions 408 and 406 can be subtracted from the sum of the detector output signals corresponding the regions 410 and 412. The resulting difference is divided by the sum of the detector output signals from all four regions 406, 408, 410, and 412. When properly aligned vertically, the resulting difference will be zero. A feedback system may be used to adjust (and maintain) the alignment so that the difference is zero.

In addition, the free space optical system 500 provides communication functions as follows. The region 414 is aligned with the core 402. In one embodiment, the region 414 is transparent or, alternatively, implemented as an opening in the ferrule 404. Thus, light incident on the region 414 can be collected by the core 402 and transmitted to the communications detector 506. In one embodiment, the communications detector 506 operates to recover communication information from the received light signal as in conventional optical systems.

Note, when the incoming light beam 501 is incident solely within the region 414, essentially no light is redirected to the tracking detectors corresponding to the regions 406, 408, 410 and 412. This may be a desirable condition when the receiver sensitivity depends on efficient use of the signal collected by the communication detector 506. In this embodiment, signal processing downstream of the tracking detectors may utilize the photocurrent through the communications detector 506 to recognize that the incoming light beam 501 is collected solely within the region 414.

The free space optical system 500 has several advantages over conventional optical communication systems. For example, unlike conventional quadrant detectors, a user need not perform an alignment operation to align a particular tracking detector (e.g., detectors 502 and 504) and the incoming light beam 501. Instead, the combination of the components of the free space optical system 500 functions as a virtual multiple element tracking and communication detector in which the critical alignment takes place during manufacture. More particularly, the critical alignment takes place when the gratings are applied to the regions 406, 408, 410 and 412 of the tip of ferrule 404. This feature can allow a user to more easily set up the free space optical system 500 compared to conventional systems. Furthermore, robustness of the system during stresses that arise from shock or temperature variation is a direct consequence of the monolithic nature of the coated ferrule assembly.

The free space optical system 500 can also have a cost advantage. For example, because the tracking detectors (e.g., detectors 502 and 504) can be off-the-shelf low cost detectors such as PIN photodiodes, or APDs, the cost of a free space optical system such as the free space optical system 500 is reduced. Additionally, with a free space optical system such as the free space optical system 500 the need for a beam splitter to separate the incoming beam into a portion for tracking and a portion for communications is eliminated, which can further reduce costs.

Figure 6:
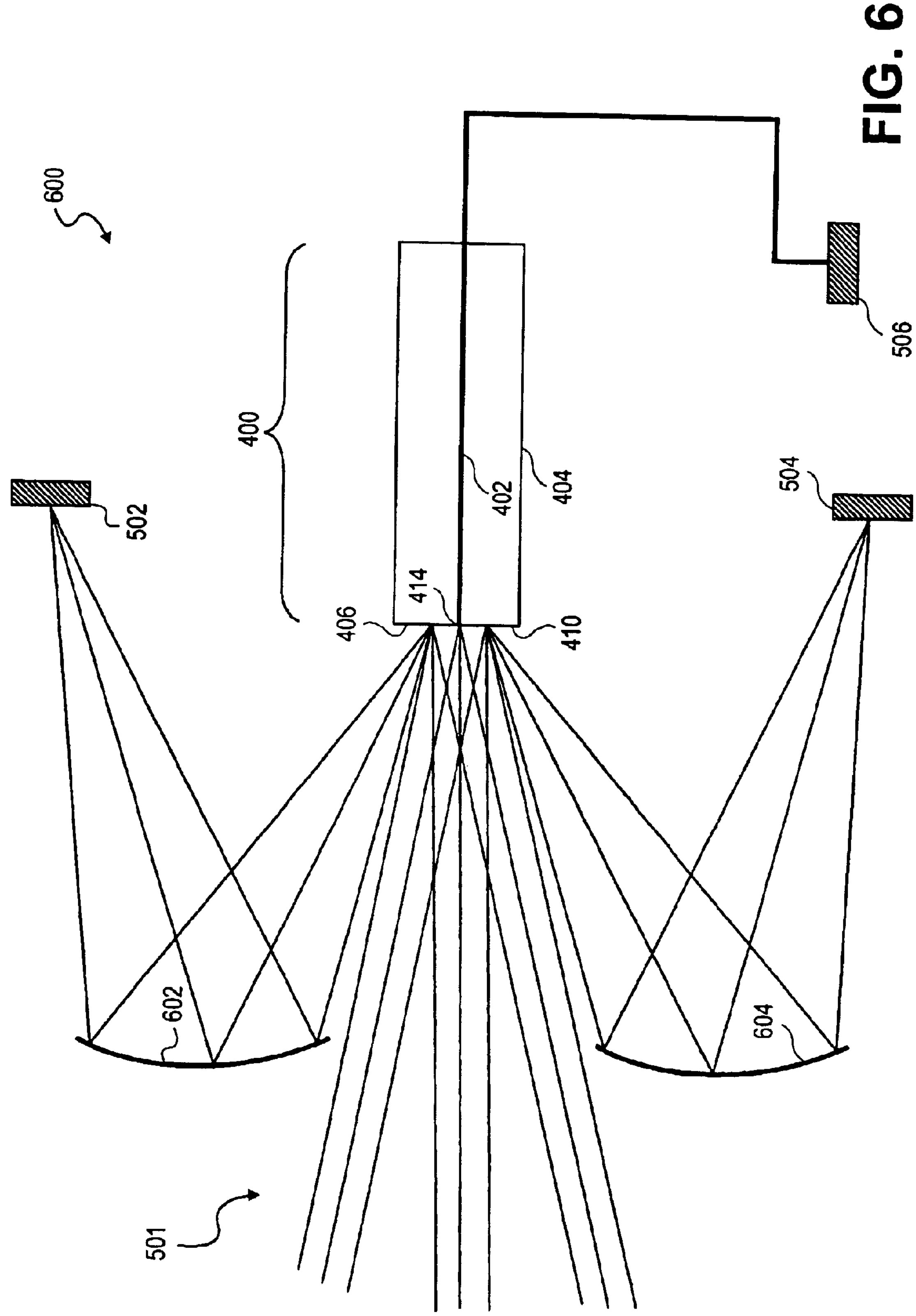
FIG. 6 is a diagram illustrating an alternative example free space optical system that includes the optical fiber assembly of FIGS. 4A and 4B, according to an embodiment of the present invention.

FIG. 6 illustrates a side cross-sectional view of a free space optical system 600, according to an alternative embodiment of the present invention. This embodiment is substantially the same as the free space optical system 500 (FIG. 5) with the addition of collection optics 602 and 604 corresponding to the detectors 502 and 504, respectively.

In this embodiment, light that is diffracted from face of the ferrule 404 is redirected to the tracking detectors (e.g., the detectors 502 and 504) via the collection optics 602 and 604, respectively. Similarly, light may be diffracted to the tracking detectors (not shown) corresponding to the regions 408 and 412 via the other collection optics (not shown). The collection optics may be imaging or non-imaging optics. To help improve clarity, FIG. 6 only shows the collection optics 602 and 604 and the tracking detectors 502 and 504 associated with regions 406 and 410. However, the collection optics and the tracking detectors associated with the regions 408 and 412 (FIG. 4A) are part of the free space optical system 600, but are not shown. Thus, light may be diffracted from the regions 408 and 412 to these corresponding tracking detectors (not shown) via the corresponding collection optics (not shown).

Light incident on the region 406 may be efficiently coupled into the $1^{st}$ order diffracted beam from the surface or volume grating formed on the region 406. In the event that light is partially coupled into other orders, care must be taken in the design to ensure that this light is not collected by one of the unintended tracking detectors. For example, the optical elements may be designed to ensure that light from the region 408 is diffracted to the tracking detector 502 as a $1^{st}$ order beam and the light from the region 410 is diffracted to the tracking detector 504 as a $1^{st}$ order beam. The $-2^{nd}$, $-1^{st}$ and $+2^{nd}$ order beams from these regions, for example, may be directed by design to not be collected by any of the detectors, while other order beams are mapped to detectors associated with the regions 406 and 412. Other embodiments may use gratings that are designed to provide different combinations of beam orders.

Although the tracking detectors 502 and 504 and the collection optics 602 and 604) are shown widely separated in FIG. 6, the collection optics may be positioned such that light from each region is redirected to areas that are in close proximity to each other. This would allow the tracking detectors 502 and 504 (and the tracking detectors associated with the regions 408 and 412) to reside on the same board, hybrid chip, or even die. For example, a conventional quadrant detector could be used for this function and all four detectors would coexist on one die. The advantage of loose alignment tolerance would still apply since each of the four individual collection beams from regions 406, 408, 410, and 412 (FIG. 4A) only need to be within their respective quadrant on the quadrant detector surface. This is in sharp contrast to the usual need to have precise alignment of a tracking beam to the vertex of the four quadrants.

Further, the present invention is not limited to the five regions 406, 408, 410, 412, and 414 (FIG. 4A). The present invention may be implemented using three or more regions plus a center region overlapping the core 402.

Figure 7B:
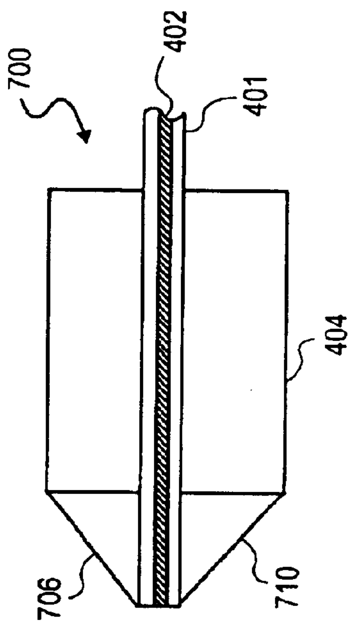
FIGS. 7A and 7B illustrate an end view and a side view, respectively, of a reflection-based optical fiber assembly according to embodiments of the present invention.
Figure 7A:
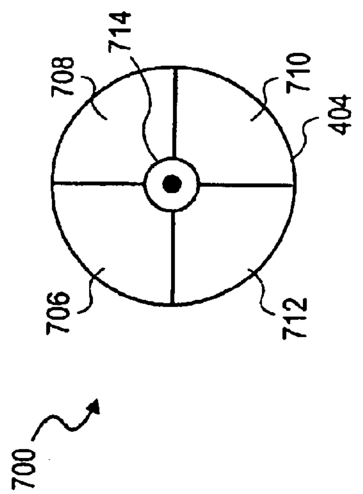

FIGS. 7A and 7B illustrate an end view and a side cross-sectional view, respectively, of an optical fiber assembly 700 according to an alternative embodiment of the present invention. In contrast to optical fiber assembly 400 (FIGS. 4A and 4B), the optical fiber assembly 700 is reflection-based (e.g., reflection from a faceted ferrule rather than diffraction from gratings formed on the ferrule face). The optical fiber assembly 700 includes the ferrule 404 (as in FIGS. 4A and 4B), but instead of the regions 406, 408, 410 and 412, the ferrule 404 of the optical fiber assembly 700 includes reflective facets 706, 708, 710 and 712. Note, the cross-sectional view of FIG. 7B is taken diagonally across the face of the ferrule 404 (as shown in FIG. 7A). In the embodiment of FIGS. 7A and 7B, each of the facets 706, 708, 710, and 712 covers approximately one-quarter of the face of the ferrule 404. The ferrule 404 also has a region 714 at the vertex of the facets 706, 708, 710, and 712.

Using reflective principles (rather than diffraction principles as in the optical fiber assembly 400 of FIGS. 4A and 4B), this embodiment operates as follows. The light of incoming light beam 501 that is incident on the fiber core 402 is collected and propagated by the optical fiber 401 to a communications detector 506 (e.g., see FIG. 8). The reflective facets are angled to reflect light incident on the facets to tracking detectors similar to the tracking detectors 502 and 504. This tracking information can be used to adjust the alignment between an incoming light beam and the free space optical system.

Although a four facet embodiment is shown in FIGS. 7A and 7B, other embodiments of the ferrule 404 may be faceted with three or more angled reflective facets.

Figure 8:
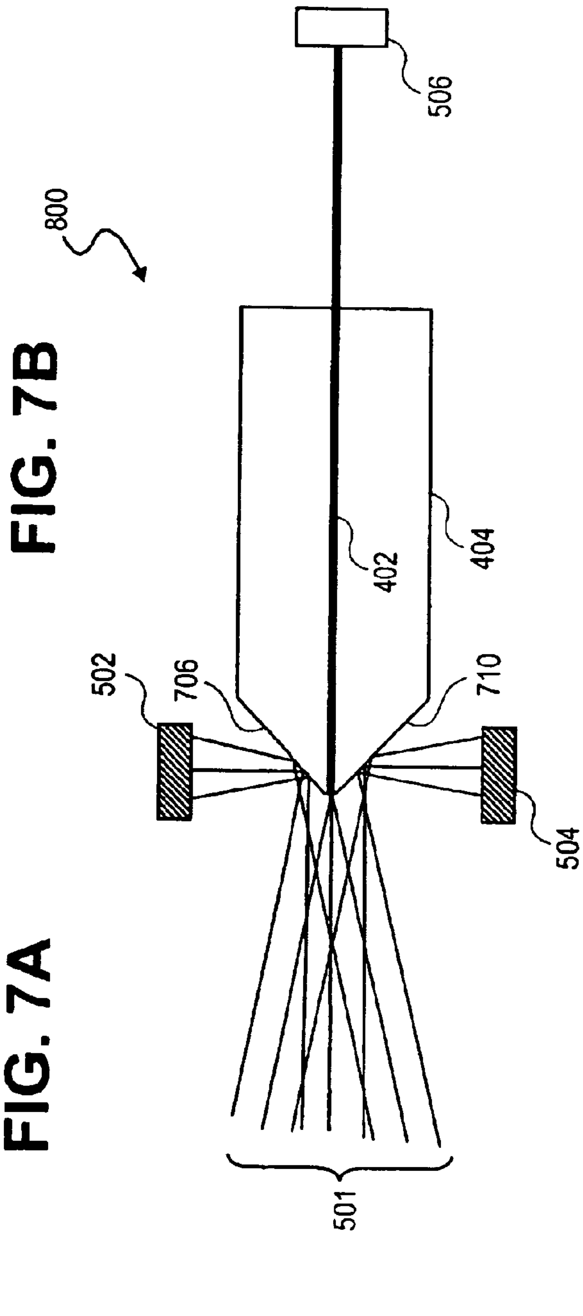
FIG. 8 is a schematic diagram of an example free space optical system embodying the reflection-based optical fiber assembly depicted in FIGS. 7A and 7B according to and embodiment of the present invention.

FIG. 8 illustrates a free space optical system 800 that includes the optical fiber assembly 700 (FIGS. 7A and 7B). The free space optical system 800 includes the tracking detectors 502 and 504 (described above) corresponding to the facets 706 and 710, respectively. The free space optical system 800 also includes the communications detector 506, which is also described above. In addition, the free space optical system 800 includes tracking detectors (not shown) corresponding to the facets 708 and 712 (FIG. 7A).

Referring to FIG. 8 and FIGS. 7A and 7B, the free space optical system 800 operates as follows. The incoming light beam 501 is incident on the end of the ferrule 404. The core 402 propagates any light of the incoming light beam 501 that is incident on the core 401. On the other hand, the facets 706, 708, 710, and 712 reflect any light of the incoming light beam 501 that is incident on the facets to their corresponding tracking detectors (e.g., the detectors 502 and 504). Similar to the embodiments described above, the distribution of light of incoming light beam 501 on the facets 706, 708, 710 and 712 is related to the alignment between the incoming light beam 501 and the free space optical system 800. Thus, the output signals of the tracking detectors can be used to adjust the alignment between the free space optical system 800 and the incoming light beam 501 as described above.

In a further refinement, this alternative reflective approach can include collection optics similar to the collection optics 602 and 604 to direct the reflected light to the tracking detectors.

In some cases, the area required for the cladding of the optical fiber 401 and/or imperfections in the polishing of the facets 706, 708, 710, and 712 can result in some small regions of the ferrule 404 tip to not direct light to either the communications detector 506 or the tracking detectors (e.g., detectors 502 and 504). According to embodiments of the present invention, a small lens may be used to focus the light that would otherwise be incident on the cladding onto the core 402. For example, the lens may be attached directly to the tip of the optical fiber 401. Alternatively, the Up of the optical fiber 401 may be modified to make the tip act as a lens (e.g., by using microlens technology). In addition, the effect of imperfections in the facets 706, 708, 710, and 712 may be reduced if the optical fiber 401 extends outward or inward from the ferrule 404 tip slightly so that the light that misses the optical fiber 401 is not at a tight focus when striking the facets 706, 708, 710, and 712.

Figure 9:
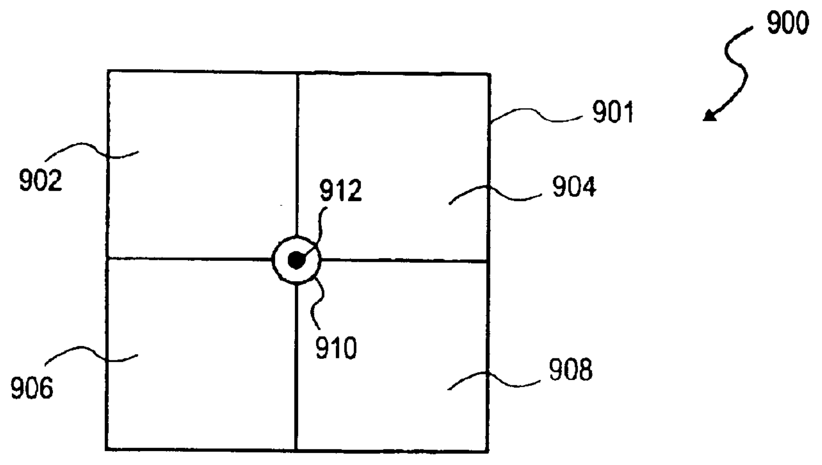
FIG. 9 illustrates an embodiment of an optical fiber assembly, in which a quadrant cell has four quadrants, a vertex common to the quadrants, and an opening aligned with the vertex for insertion of an optical fiber tip.

FIG. 9 illustrates an optical fiber assembly 900 according to another embodiment of the present invention. In this embodiment, the optical fiber assembly 900 includes a quadrant detector 901 having four quadrants 902, 904, 906, and 908, and a vertex 910 common to the quadrants 902, 904, 906, and 908. An opening in the quadrant detector 901 is formed at the vertex 910. An optical fiber 912 is positioned so that its tip extends through the opening at the vertex 910.

In this embodiment, the quadrant detector 901 can be implemented with a conventional quadrant detector (i.e., one that provides a tracking signal from each quadrant that is dependent on the amount of light incident on that quadrant).

In operation, the optical fiber 912 propagates light from an incoming light beam to a communication detector similar to the communication detector 506 (FIG. 5). The quadrants 902, 904, 906, and 908 of the quadrant detector 901 output the aforementioned tracking signals to electronics (not shown). These electronics can adjust the alignment between the incoming light beam and the optical fiber assembly 900 (or the system in which it is incorporated). For example, in one embodiment these electronics adjust the horizontal and vertical alignment in a manner similar to that described above in conjunction with FIG. 5.

Figure 10:
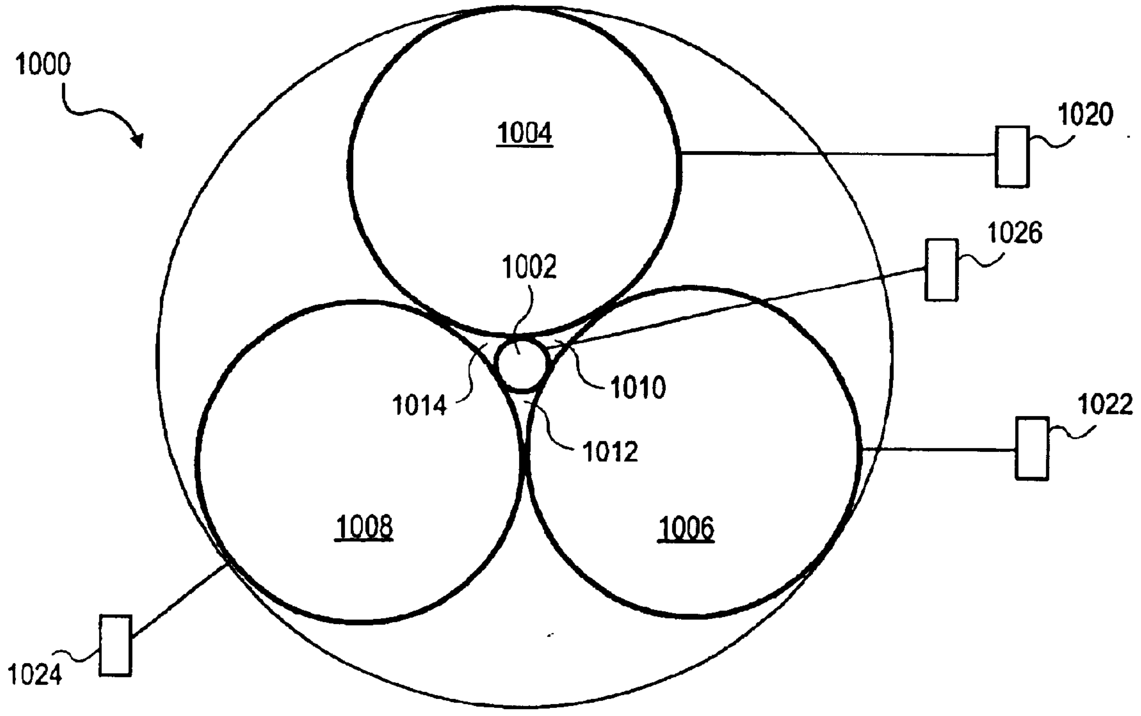
FIG. 10 illustrates an embodiment of an optical fiber assembly, in which the light that misses the core of a communication fiber is largely collected by one of three tracking fibers that surround the communication fiber.

FIG. 10 illustrates an embodiment of an optical fiber assembly 1000, according to another embodiment of the present invention. In this embodiment, the optical fiber assembly 1000 includes a communication fiber 1002 and three tracking fibers 1004, 1006, and 1008 arranged around the communication fiber 1002. In this embodiment, the tracking fibers 1004, 1006, and 1008 are essentially identical plastic optical fibers, which are typically much larger than the communication fiber 1002. Further, the fibers 1002, 1004, 1006, and 1008 all have cross sections that are essentially circular. In one embodiment, the diameter ratio of the communication fiber 1002 to each one of the tracking fibers 1004, 1006, and 1008 is 0.155. Because these fibers are circular in cross section, this arrangement forms "dead zones" 1010, 1012 and 1014 between the fibers.

The tracking fibers 1004, 1006, and 1008 are coupled to tracking detectors 1020, 1022, and 1024, respectively. The communication fiber 1002 is coupled to a communications detector 1026 similar to the previously described communications detector 506 (FIG. 5).

In operation, the dead zones do not collect light from an incoming light beam. The dead zones 1010, 1012, and 1014 may be reduced in a variety of ways. In one embodiment, the size of the dead zones 1010, 1012, and 1014 may be reduced by heating the ends of tracking fibers 1004, 1006, and 1008 (i.e., portion near the tip of the communication fiber 1002) slightly while squeezing them concentrically to cause the plastic to flow slightly into the dead zones 1010, 1012, and 1014. In this way, each of tracking fibers 1004, 1006, and 1008 reduce the dead zones 1010, 1012, and 1014 by substantially conforming to a portion of the outer surface of communication fiber 1002 and by contacting adjacent tracking fibers across a larger area.

In an alternative embodiment, the communication fiber 1002 is positioned forward of a plane containing the tips of the tracking fibers 1004, 1006, and 1008 such that an incoming light beam strikes the communication fiber 1002 as a tightly focused spot. This tight focus causes any of the incoming light beam that misses the communication fiber 1002 to expand as it propagates past the focused plane. This divergence tends to increase the amount of light that will strike the tracking fibers 1004, 1006, and 1008, thereby reducing the effect of the dead zones 1010, 1012, and 1014.

When the dead zones 1010, 1012, and 1014 are present, the effects of the dead zones 1010, 1012, and 1014 may be mitigated in a variety of ways. For example, the effects dead zones 1010, 1012, and 1014 may be reduced using a lens (not shown) on the tip of the communication fiber 1002. This lens would be used to focus light of the incoming light beam that would otherwise strike the dead zones 1010, 1012, and 1014 to strike the communication fiber 1002.

Alternatively, a diffractive optical element may be inserted in front of the communication fiber 1002 and the tracking fibers 1004, 1006, and 1008 to spread the light of the incoming light beam that will not strike the communication fiber 1002 into an arc distribution. For example, a radial transmission grating can be used to spread the light as described above. This radial transmission grating would have a clear center region to be aligned with the communication fiber 1002 to that with proper alignment, the incoming light beam will strike the communication fiber without being diffracted.

FIGS. 11A through 11E illustrate an optical fiber assembly 1100, according to another embodiment of the present invention. This example optical fiber assembly 1100 includes a mounting plate 1102, a communications fiber 1104, and several tracking fibers 1106, 1108, 1110, and 1112. The mounting plate 1102 has an opening in its center to receive the communication fiber 1104.

Figure 11A:
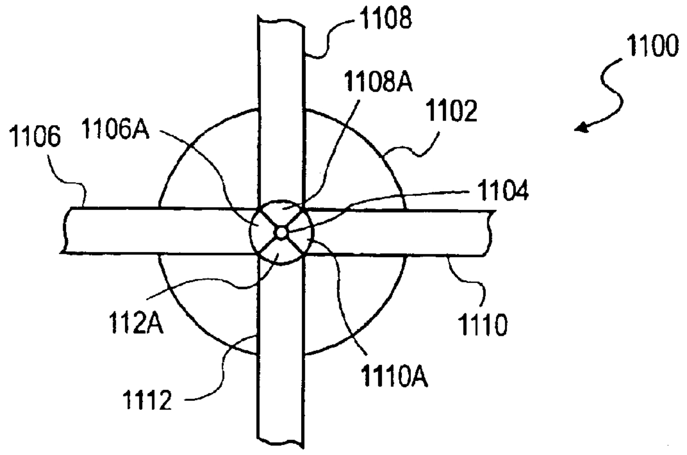
FIGS. 11A through 11E illustrate an embodiment of an optical fiber assembly that includes a mounting plate with an opening in the center to receive the communication fiber.
Figure 11B:
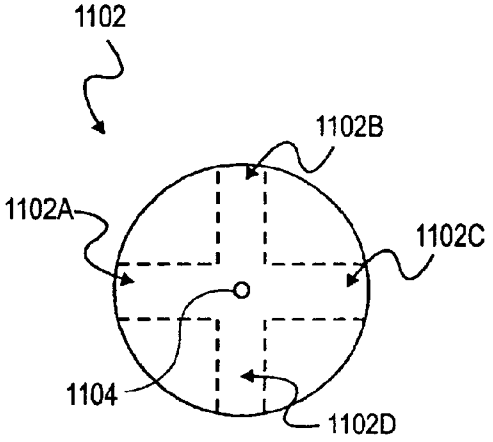
Figure 11C:
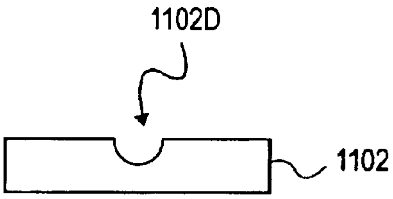
Figure 11D:
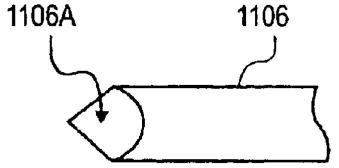
Figure 11E:
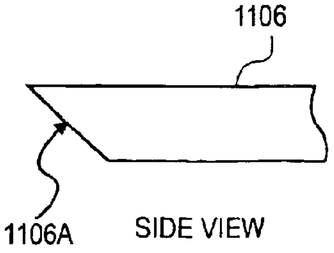

Each of the tracking fibers 1106, 1108, 1110, and 1112 may be a large core plastic optical fiber that has one end polished (or faceted) at a forty-five degree angle, as illustrated in FIG. 11E for the tracking fiber 1106. The forty-five degree facet 1106A is also shown in top view by FIG. 11D. The tip of each of the tracking fibers 1106, 1108, 1110, and 1112 is trimmed by removing a small amount of material so that the end of each tip has a protrusion that shaped like a "pie slice" when viewed from the top, as illustrated in FIG. 11D for the tracking fiber 1106. In one embodiment, the "corner" of the pie slice forms a ninety-degree angle.

The mounting plate 1102 may be a glass or plastic mounting plate with several grooves. In this embodiment, the optical fiber assembly has four grooves 1102A–1102D for the four tracking fibers 1106, 1108, 1110 and 1112. The grooves 1102A–1102D are indicated using dashed lines in the top view of FIG. 11B. The groove 1102D is shown more clearly in FIG. 11C. The four grooves 1102A–1102D of the mounting plate 1102 form ninety-degree angles with each other as illustrated in FIG. 11B.

These grooves are used to accept the protrusions of the tracking fibers 1106, 1108, 1110, and 1112. The tracking fibers 1106, 1108, 1110 and 1112 may be fitted to the grooves of the mounting plate 1102 and attached to the mounting plate 1102 using any suitable adhesive or fastener. For example, an ultraviolet curing epoxy may be used to attach the tracking fibers 1106, 1108, 1110, and 1112 to the grooves of the mounting plate 1102. The ninety-degree angles of the protrusions allow the ends of the tracking fibers 1106, 1108, 1110 and 1112 to fit together so that there are no dead zones around the communication fiber 1102, as illustrated in FIG. 11A.

The refractive index of the mounting plate 1102, the epoxy, and the cores and claddings of the tracking fibers 1106, 1108, 1110, and 1112 are similar such that an incoming light beam incident on the flat surface of the mounting plate 1102 passes through the mounting plate 1102, the epoxy, and the tracking fibers 1106, 1108, 1110, and 1112. Light incident on the top surface of a tracking fiber near the forty-five degree facet passes through the top surface to reach the facet. Then the light is reflected from the forty-five degree polished surface by total internal reflection (TIR) to propagate toward the other end of the tracking fiber. Alternatively, light is reflected by coating applied to the surface of the angled tips of the tracking fibers 1106, 1108, 1110, and 1112 after polishing. The light is then guided by the tracking fibers 1106, 1108, 1110, and 1112 to detectors coupled to the tracking fibers 1106, 1108, 1110, and 1112.

According to an embodiment of the present invention, a multi-clad fiber optical transceiver includes a single mode core as a transmitter and a concentric multimode core as a communication receiver. Wavelength and/or polarization gendering may be used to enhance isolation of the transmitted light beam from the received light beam. Alternatively, time division multiplexing (TDM) of the transmit operations and the receive operations may provide the signal isolation.

Figure 12:
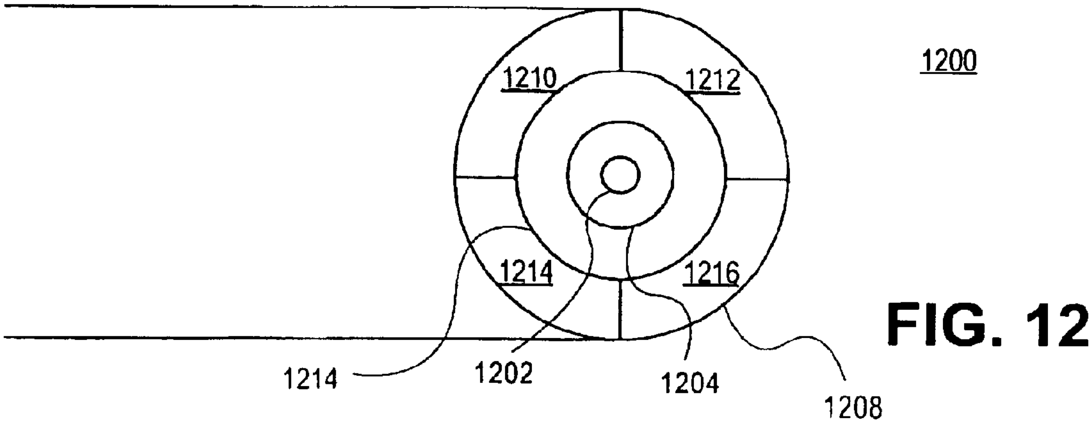
FIG. 12 illustrates a multi-clad optical fiber assembly according to embodiments of the present invention.

FIG. 12 illustrates an end view of a multi-clad optical fiber assembly 1200 according to yet another embodiment of the present invention. The example optical fiber assembly 400 is a multifunction component that includes a transmit, single-mode core 1202, a receive, multi-mode core 1204, cladding 1206, and a ferrule 1208. The tip of ferrule 1208 is partitioned into several regions 1210, 1212, 1214, and 1216. These regions can have gratings or reflective facets formed thereon to redirect light to tracking detectors (not shown) as described above in conjunction with FIG. 5, 6 or 8. The receive core 1204 is coupled to a communication detector (not shown) to receive and process an incoming light beam transmitted by an optical transceiver (not shown). In one embodiment, the transmit core 1202 is coupled to an optical transmitter (not shown) to transmit an outgoing light beam to the optical transceiver that transmitted the incoming light beam.

Beam Shaping For A Unitary Alignment-Free Tracking System

In addition to receiving an incoming light beam with the communications portion of a free space optical system, in some applications it is desirable to continually receive some of the incoming light beam with the tracking portion of the free space optical system. In this way, the tracking portion of the free space optical system will continuously have a signal(s) indicating the location of the light beam for tracking purposes. On the other hand, if the light beam is centered on the communication fiber such that no light is collected by the tracking fibers, the tracking portion of the free space optical system will have no signal to operate on, which may not be desirable in some systems.

Figure 13:
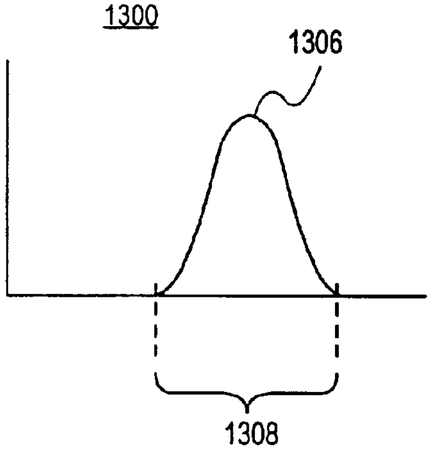
FIG. 13 is a graphical representation of energy distribution of a light beam according to embodiments of the present invention.

FIG. 13 is a graphical representation 1300 of a light distribution 1306 of a light beam centered on the communication fiber. Note the majority of energy is distributed in a region 1308, which represents the communication fiber core region. As described above, this distribution may not be desirable in some free space optical systems. In one approach, well-known beam shaping optics are placed in the receive path to alter the light distribution so that some light will be received by the tracking portion of the free space optical system.

Figure 14:
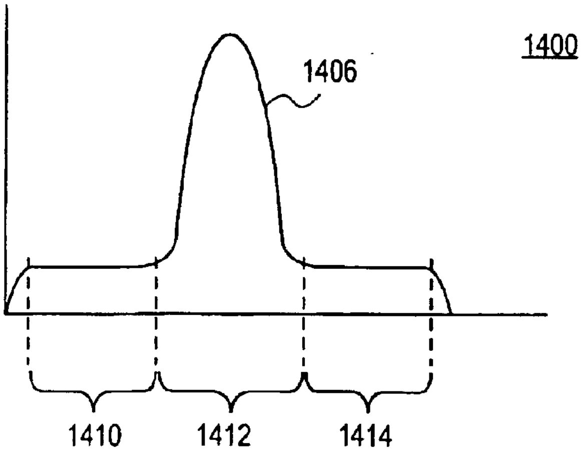
FIG. 14 is a graphical representation of energy distribution of a light beam according to alternative embodiments of the present invention.

FIG. 14 shows a graphical representation 1400 of a light distribution 1406 altered to create a pedestal of energy in regions 1410 and 1412 rather than being tightly focused on a region 1412. In operation, the light corresponding to the regions 1410 and 1412 would be incident on the face of a ferrule or on tracking fibers such as those described for the various embodiments above. The ferrule or tracking fibers would then cause the light corresponding to the regions 1410 and 1412 to propagate to tracking detectors such as those described for the various embodiments above.

Although various embodiments are described with respect to a free space optical system, the present invention is not so limited. Aspects of the invention can be implemented using hardware, software, or a combination of hardware and software. Such implementations include state machines, a field programmable gate array (FPGA), a microprocessor, an application specific integrated circuit (ASIC), discrete medium scale integrated (MSI) circuits, analog circuitry, etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

What is claimed is:

1. A free space optical apparatus, comprising:

an optical fiber to propagate at least a portion of an incoming light beam; and a ferrule coupled to the optical fiber, wherein the ferrule includes a plurality of regions to direct one or more portions of the incoming light beam in one or more predetermined directions, wherein at least one region of the plurality of regions includes a diffractive optical element, an amount of light in each of the one or more portions being a function of an alignment between the incoming light beam and the apparatus.

2. The apparatus of claim 1, wherein the diffractive element comprises a surface grating.

3. The apparatus of claim 1, wherein the diffractive optical element comprises a hologram.

4. The apparatus of claim 3, wherein the hologram comprises a volume phase grating.

5. The apparatus of claim 1, wherein the diffractive element diffracts incident light so that substantially all the diffracted light is in a preselected order.

6. The apparatus of claim 1, wherein a first region and a second region of the plurality of regions each include a diffractive optical element, each diffractive element to diffract incident light so that substantially all the light diffracted by that diffractive element is in a preselected diffraction order, the direction of the preselected diffraction order of the first region being different from that of the second region.

7. The apparatus of claim 1, wherein at least one region of the plurality of regions includes a reflective facet.

8. A free space optical system, comprising:

an optical fiber having a first end to receive at least a portion of an incoming light beam;

a communications detector, coupled to a second end of the optical fiber, to receive the received portion of the incoming light beam via the optical fiber;

a ferrule fitted to the first end of the optical fiber, wherein the ferrule includes a plurality of regions to direct one or more portions of the incoming light beam in one or more predetermined directions, wherein at least one region in the plurality of regions includes a diffractive optical element, an amount of light of each of the one or more portions being a function of an alignment between the incoming light beam and the system; and a plurality of tracking detectors arranged to receive the one or more portions directed by the plurality of regions.

9. The system of claim 8, wherein at least one of the plurality of tracking detectors is a photodiode.

10. The system of claim 8, wherein at least one of the plurality of tracking detectors is an avalanche photodiode.

11. The system of claim 8, further comprising collection optics arranged to redirect the portions directed by the plurality of regions to the plurality of tracking detectors.

12. The system of claim 8, further comprising a lens coupled to the first end of the optical fiber, wherein light directed toward a cladding of the optical fiber will be redirected to a core of the optical fiber by the lens.

13. The system of claim 8, wherein the diffractive element comprises a surface grating.

14. The system of claim 8, wherein the diffractive optical element comprises a hologram.

15. The system of claim 14, wherein the hologram includes a volume phase grating.

16. The system of claim 8, wherein the diffractive element diffracts incident light so that substantially all the diffracted light is in a preselected order.

17. The system of claim 8 further comprising a mount having an opening aligned with the first end of the optical fiber, wherein the plurality of tracking detectors are attached to mount.

18. The system of claim 8 wherein the incoming light beam has a pedestal distribution.

19. A free space optical apparatus, comprising:

an optical fiber having a first section and a second section, wherein the first section to receive at least a portion of an incoming light beam and wherein the second section to propagate an outgoing light beam; and a ferrule coupled to the optical fiber, wherein the ferrule includes a plurality of regions to direct one or more portions of the incoming light beam that are not incident on the optical fiber in one or more predetermined directions, each region in the plurality of regions including a diffractive optical element, an amount of light in each of the one or more portions being a function of an alignment between the incoming light beam and the apparatus.

20. The apparatus of claim 19, wherein the diffractive element comprises a surface grating.

21. The apparatus of claim 19, wherein the diffractive optical element comprises a hologram.

22. The apparatus of claim 21, wherein the hologram comprises a volume phase grating.

23. The apparatus of claim 19, wherein the diffractive element diffracts incident light so that substantially all the diffracted light is in a preselected order.

24. The apparatus of claim 19, wherein a first region and a second region of the plurality of regions each include a diffractive optical element, each diffractive element to diffract incident light so that substantially all the light diffracted by that diffractive element is in a preselected diffraction order, the direction of the preselected diffraction order of the first region is different from that of the second region.

25. The apparatus of claim 19, wherein at least one region of the plurality of regions includes a reflective facet.

26. The apparatus of claim 19, wherein the incoming light beam has a pedestal distribution.

27. A method, comprising:

receiving an incoming light beam using an apparatus that includes an optical fiber and a ferrule fitted to the optical fiber, the ferrule having a plurality of regions;

propagating light of the incoming light beam that is incident on the optical fiber to a communications detector; and redirecting light of the incoming light beam that is incident on the plurality of regions of the ferrule to at least one of a plurality of tracking detectors using a diffractive optical element, wherein each region of the plurality of regions redirects incident light of the incoming light beam to a corresponding preselected tracking detector of the plurality of tracking detectors.

28. The method of claim 27, wherein redirecting light of the incoming light beam further comprises reflecting light that is incident on a region of the plurality of regions using a reflective coating applied to that region.

29. The method of claim 27, wherein redirecting light of the incoming light beam further comprises using collection optics to redirect light from the plurality of regions to the plurality of tracking detectors.

30. The method of claim 27, wherein the incoming light beam has a pedestal distribution.

* * * * *